Dec. 4, 1923.  
F. B. PARKER ET AL  
1,476,174  
CLEANER FOR WINDSHIELDS AND THE LIKE  
Filed Nov. 15, 1922
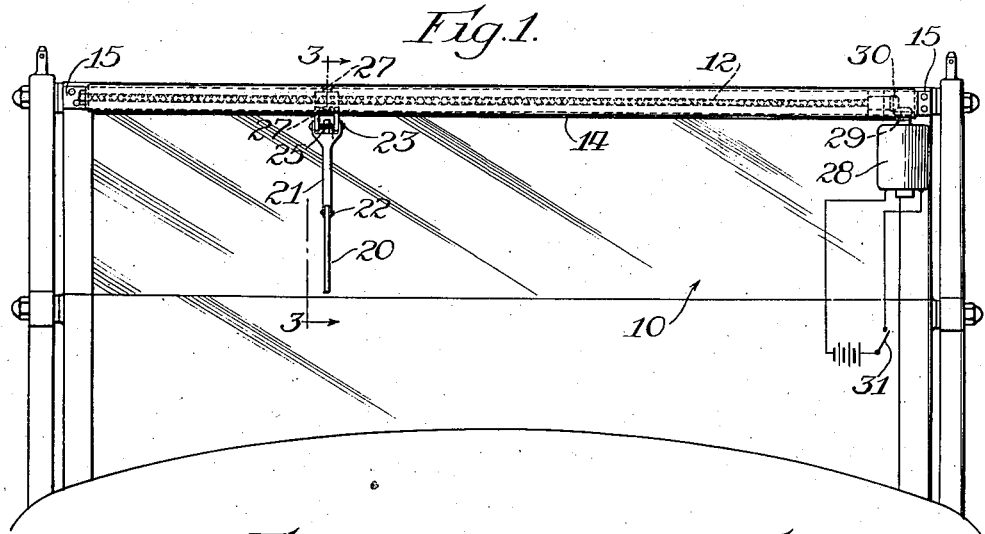
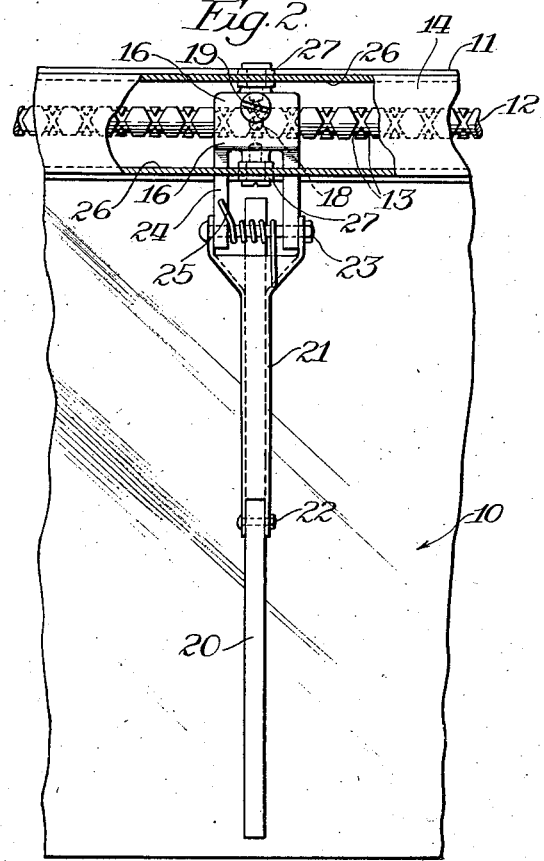
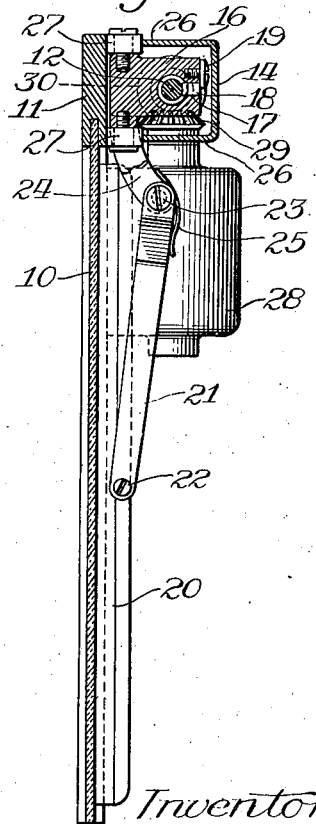
Inventors  
Frank B. Parker  
Herbert R. Goodfellow  
By  
Atty.

Patented Dec. 4, 1923.

1,476,174

UNITED STATES PATENT OFFICE.

FRANK B. PARKER AND HERBERT R. GOODFELLOW, OF CHICAGO, ILLINOIS.

CLEANER FOR WINDSHIELDS AND THE LIKE.

Application filed November 15, 1922. Serial No. 601,006.

*To all whom it may concern:*

Be it known that we, FRANK B. PARKER and HERBERT R. GOODFELLOW, respectively a citizen of the United States and a subject of the King of England, residing at Chicago, in the county of Cook and State of Illinois, have invented certain new and useful Improvements in Cleaners for Windshields and the like, of which the following is a specification.

This invention relates to improvements in cleaners for wind shields and the like particularly adapted, though not necessarily limited in its use with motor vehicles, and one of the objects of the invention is to provide an improved device of this character adapted to traverse substantially the entire shield and which operation may be continuous or the device may operate for any desired space of time according to the will of the operator.

A further object is to provide an improved mechanically operated device of this character having its operating parts so arranged as not to obstruct the vision of the operator.

A further object is to provide an improved device of this character which will be of a simple, durable and compact construction adapted to be readily installed and which will be effective and efficient in operation.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention and in which—

Figure 1 is a view in elevation of the wind shield of a motor vehicle having a cleaning device constructed in accordance with the principles of this invention applied thereto.

Figure 2 is an enlarged detail front elevation with parts broken away.

Figure 3 is a sectional view taken on line 3—3, Figure 1.

Referring more particularly to the drawing the numeral 10 designates generally the wind shield of a motor vehicle, having the usual frame 11.

Arranged along the upper edge of the shield and to extend substantially entirely across the shield is a shaft 12, which is provided with a double screw 13. The shaft is mounted in suitable bearings carried in a frame 14, the frame being of a substantially U shaped configuration for housing the shaft, and the extremities of the frame are flanged as at 15 and by means of which flanges the frame may be secured in position preferably by fastening the same to the frame 11 of the wind shield.

A traveling member 16 is mounted upon the shaft 12. This member is provided with an opening 17, into which a pin or lug 18 projects and which pin or lug engages in the threads 13 of the shaft 12. The pin or lug is held in position in any suitable manner such as by means of a fastening screw 19, entering the member 16 in such a position that the head of the screw will overlap the pin 18. When it is desired to remove the pin the screw may be first removed to permit the pin to be shifted so as to disengage the shaft 12. A scraper or wiper 20 is connected with the member 16 in any suitable manner preferably by means of a link 21, which is pivotally connected as at 22 with the wiper and is also pivotally connected as at 23 with an arm like portion 24 of the member 16. A spring 25 is preferably arranged about the pivot 23 and operates upon the arm 21, which latter is preferably in the form of a link so as to move the arm in a direction to cause the wiper to be normally held against the shield 10.

As a means for maintaining the member 16 in the proper position and for preventing the same from tilting downwardly away from the shield or screen, any suitable means may be provided but for that purpose the frame 14 may be employed. To that end the walls 26 of the frame 14 terminate short of the frame 11 of the shield or screen and connected with the member 16 are rollers 27, which are disposed between the ends of the walls 26 of the casing 14 and the frame 11 of the shield or screen, thereby permitting the member 16 to travel along the shaft 12

The shaft is adapted to be rotated in any desired or suitable manner preferably by means of a motor 28 connected with the shaft of which is a gear 29 preferably of the beveled type, which meshes with a gear 30, preferably of the beveled type, secured to the end of the shaft 12 so that when the motor is operated the shaft 12 will be rotated and the direction of rotation of the shaft always remains constant. When the shaft is rotated the member 16 carrying with it the wiper 20 will be moved longitudinally of the shaft and across the screen or shield 10 from one end thereof, covering substantially the entire area of the screen, until the member 16 reaches the limit of the screw which runs in one direction about the shaft 12. When the member 16 reaches the end of the shaft 12, the screw threads or spirals which run in the opposite direction about the shaft will receive the end of the pin 18 and the direction of movement of the member 16 will be reversed and the wiper will be caused to move across the wind shield in the opposite direction, the direction of travel of the member 16 being reversed as the member 16 reaches each end of the shaft 12.

Thus it will be manifest that the wiper 20 will be automatic in its action and will travel back and forth across the wind shield or screen without interfering with the vision of the operator. The speed of travel of the wiper is controlled by the speed of rotation of the shaft 12 and it is manifest that the gears 29—30 may be of any desired size and proportion to produce the desired rate of speed. The motor may also be of a size and speed to accomplish this result.

Any suitable means may be provided for controlling the operation of the motor and to that end the motor may be driven from the battery, there being provided a suitable switch device 31, in a convenient position for the operator.

Obviously the motor 28 may be supported in any desired or suitable manner.

It will also be manifest that this device may be readily applied to a wind shield or screen and may as readily be removed, the whole device being constructed as a unit.

While the preferred form of the invention has been herein shown and described it is to be understood that various changes may be made in the details of construction and in the combination and arrangement of the several parts, within the scope of the claims, without departing from the spirit of this invention.

What is claimed as new is:—

1. A cleaner of the character described embodying a shaft extending in a direction across a window or screen, means for rotating the shaft, a traveling member connected with the shaft, means whereby the rotation of the shaft will cause the said member to move therealong, a wiper pivotally connected with said traveling member, means tending normally to hold the wiper against the window, and rollers connected with the said traveling member on opposite sides of the said shaft and movable across the adjacent face of the window or screen.

2. A cleaner of the character described embodying a shaft extending in a direction across a window or screen, means for rotating the shaft, a frame in which the shaft is disposed, said frame extending across the window or screen, a traveling member connected with the shaft, means whereby the rotation of the shaft will cause the said member to move therealong, portions of the said frame being spaced from the adjacent face of the window or screen, rollers connected with the said member and disposed to engage the adjacent portions of the frame and the face of the window or screen and to travel in the space therebetween, a wiper pivotally connected with the said traveling member and movable across the window or screen, and means operating upon the wiper to hold the same against the window.

3. A cleaner of the character described embodying a shaft extending in a direction across a window or screen, a motor mounted in close proximity to and connected with the said shaft for driving it, means for controlling the motor at will, a frame in which the shaft is disposed, said frame extending across the window or screen, a traveling member connected with the shaft, means whereby the rotation of the shaft will cause the said member to move therealong, portions of said frame being spaced from the adjacent face of the window or screen, rollers connected with the said member and disposed to engage the adjacent portions of the frame and the face of the window or screen and to travel in the space therebetween, a wiper pivotally connected with the said traveling member and movable across the window or screen, and means operating upon the wiper to hold the latter against the window.

In testimony whereof we have signed our names to this specification on this 2nd day of November, A. D. 1922.

FRANK B. PARKER.
HERBERT R. GOODFELLOW.